(12) United States Patent
Haynes

(10) Patent No.: US 6,169,548 B1
(45) Date of Patent: Jan. 2, 2001

(54) EASILY DISMISSED MESSAGE WINDOWS

(75) Inventor: Thomas Richard Haynes, Apex, NC (US)

(73) Assignee: International Business Machine Corporation, Armonk, NY (US)

( * ) Notice: Under 35 U.S.C. 154(b), the term of this patent shall be extended for 0 days.

(21) Appl. No.: 09/185,255

(22) Filed: Nov. 2, 1998

(51) Int. Cl.$^7$ .............................. G06F 13/00; G06F 3/02
(52) U.S. Cl. .................... 345/358; 345/145; 345/339; 345/156
(58) Field of Search .................... 345/173, 343, 345/334, 157, 145, 156, 358, 339, 159, 333

(56) References Cited

U.S. PATENT DOCUMENTS

| | | |
|---|---|---|
| 5,223,828 | 6/1993 | McKiel, Jr. . |
| 5,675,364 | 10/1997 | Stedman et al. . |
| 5,751,273 * | 5/1998 | Cohen ................................ 345/156 |
| 5,757,360 * | 5/1998 | Nitta et al. ........................ 345/156 |
| 5,825,350 * | 10/1998 | Case, Jr. et al. .................. 345/163 |
| 5,995,079 * | 11/1999 | Sheasby et al. .................. 345/145 |

* cited by examiner

Primary Examiner—Raymond J. Bayerl
Assistant Examiner—Tadesse Hailu
(74) Attorney, Agent, or Firm—Anthony N. Magistrale; Andrew Dillon

(57) ABSTRACT

A method and system for efficiently dismissing displayed message windows or dialog boxes in a data processing system which includes a graphical pointing device and a moveable cursor controlled by physical movement of the graphical pointing device. Each time a message window or dialog box is displayed, the position of the moveable cursor is monitored. A slight oscillation or "wiggle" in the position of the moveable cursor is then utilized to dismiss the message window or dialog box, eliminating the requirement that specific elements within the display be selected by the user in order to dismiss the message window.

8 Claims, 6 Drawing Sheets

EASILY DISMISSED MESSAGE WINDOWS

BACKGROUND OF THE INVENTION

1. Technical Field

The present invention relates in general to improved data processing systems and in particular to an improved method and system for controlling the display and dismissal of message windows within a graphical user interface. Still more particularly the present invention relates to a method and system for permitting efficient dismissal of message windows within a graphical user interface without requiring specific graphic element selection within a data processing system.

2. Description of the Related Art

In recent years, there has been a move among computer application software developers toward graphical user interfaces. In graphical user interfaces, objects are presented for users to manipulate in ways that are similar to the way that they are manipulated in the real workplace. Objects, such as file cabinets, folders, documents, and printers, are typically displayed on the screen as icons. Users manipulate these objects with a graphical pointing device, such as a mouse, to perform desired operations. For example, to file a document in a folder that is located in a file cabinet in the real workplace, the user opens the file cabinet, locates and opens the correct folder, and puts the document inside.

In the electronic workplace of the graphical user interface, a user performs a similar process. The user opens a file cabinet icon, locates the correct folder file icon, and drops the document icon in the folder. Because this is an electronic environment, users do not have to open the folder to put the document into the folder. However, users have been able to use their knowledge of a real workplace to perform this operation.

One common feature of a graphical user interface is the so-called "message box." A message box is a small pane or window which provides information, warning, or action messages to a user. Each message box typically comprises an icon, explanatory text, and one or more push buttons. The icon allows the user to identify visually the type of message. The text explains the situation and may provide assistance. The text may be a question or statement. Push buttons allow a user to interact with the message box.

A message box may appear anywhere on the screen. When a message box appears, the system usually becomes and remains unavailable to the user until the user has acknowledged or responded to the message box by selecting one of the push buttons. Thus, the user must usually read the message, move the pointer to an appropriate response push button, and operate the push button before the user can continue. When the user "clicks" on the appropriate push button, the message box is cancelled and the user may proceed.

While providing useful information, such message boxes are sometimes a nuisance as a result of the unavailability of the system while the message box is being displayed. Thus, for example, a user playing a computer backgammon game may select a dice icon to roll the dice. If the user then re-selects the dice icon, the software might put up a message informing him that the dice have already been rolled. The user must then close the window utilizing standard graphical user interface techniques. For example, message boxes may be closed by clicking the OK button with a mouse pointer; pressing the Enter key; or, clicking the "X" (close) icon typically located in the upper-right hand corner of message boxes. Thus, specific element selection and accurate movement is typically required on the part of the user in order to dismiss a displayed message box prior to proceeding with the application.

This requirement is known in the prior art and some application developers have attempted to circumvent this problem by displaying message boxes that "time out" after a discreet period of time (e.g., ten seconds). The problem with this approach is that if the user is absent from the computer the user may not see the information before the information is dismissed. Another possible approach involves an auditory warning; however, not all computers are equipped to output audio information and particular environments in which a computer operates may prohibit effective audio interaction.

Thus, it should be apparent that a need exists for a technique whereby a message box may be easily and efficiently dismissed, returning control of the application to the user with a minimal amount of input from the user.

SUMMARY OF THE INVENTION

It is therefore one object of the present invention to provide an improved data processing system.

It is another object of the present invention to provide an improved method and system for controlling the display and dismissal of message windows within a graphical user interface.

It is yet another object of the present invention to provide a method and system for permitting efficient dismissal of message windows within a graphical user interface without requiring specific graphic element selection by the user within a data processing system.

The foregoing objects are achieved as is now described. The method and system of the present invention may be utilized to efficiently dismiss displayed message windows or dialog boxes in a data processing system which includes a graphical pointing device and a moveable cursor controlled by physical movement of the graphical pointing device. Each time a message window or dialog box is displayed, the position of the moveable cursor is monitored. A slight oscillation or "wiggle" in the position of the moveable cursor is utilized to dismiss the message window or dialog box, eliminating the requirement that specific elements within the display be selected by the user in order to dismiss the message window.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
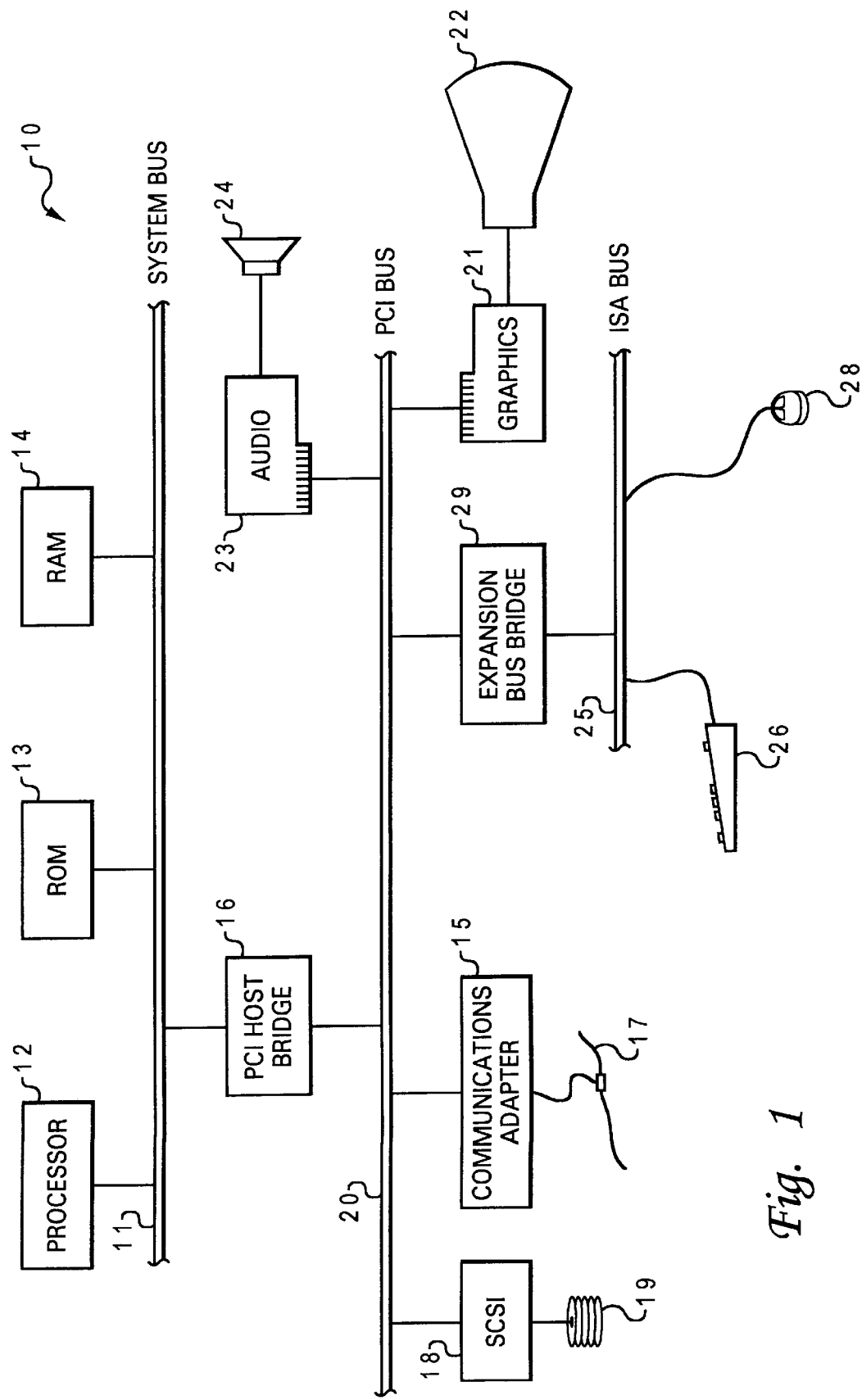
FIG. 1 is a high-level block diagram of a computer system which may be utilized to implement the method and system of the present invention.

With reference now to the figures and in particular with reference to FIG. 1, there is depicted a high-level block diagram of a computer system 10 which may be utilized to implement the method and system for the present invention. The computer system depicted may be, for example, a personal computer, a mid-range computer or a mainframe computer. In addition, the computer may be a stand-alone system or part of a network such as a local-area network (LAN) or a wide-area network (WAN). For purpose of illustration, a preferred embodiment of the present invention, as described below, is implemented on a personal computer system, such as an Aptiva™ series of personal computers manufactured by International Business Machines Corporation of Armonk, N.Y.

As illustrated, a block diagram of a personal computer system 10 is depicted within FIG. 1. As shown, a processor 12, a read-only memory (ROM) 13, and a random access memory (RAM) 14 are connected to a system bus 11 of a personal computer system 10. Processor 12, ROM 13, and RAM 14 are also coupled to a PCI bus 20 of personal computer system 10 through PCI host bridge 16. PCI host bridge 16 provides a low latency path through which a processor 12 may directly access PCI devices mapped anywhere within a bus memory and/or I/O address spaces. PCI host bridge 16 also provides a high bandwidth path allowing PCI devices to directly access RAM 14.

Also attached to PCI bus 20 is a communications adapter 15 and a small computer system interface (SCSI) 18. Communication adapter 15 connects personal computer system 10 to a local-area network (LAN) 17. Small computer system interface (SCSI) 18 may also be utilized to control a high-speed SCSI disk drive 19. Expansion bus bridge 25 such as a PCI-to-ISA bus bridge, may be utilized for coupling an ISA bus 25 to PCI bus 20. As shown, a keyboard 26 and a graphical pointing device, such as mouse 28, may also be attached to ISA bus 25 for performing basic I/O functions.

In addition, an audio adapter 23 and a graphics adapter 21 may also be attached to PCI bus 20. Graphics adapter 21 controls visual output through a video monitor 22 and audio adapter 23 controls audio output through a speaker 24.

Referring now to FIGS. 2A–2D, there are illustrated pictorial representations of a display screen 30 which illustrate the method and system of the present invention. Within FIGS. 2A–2D like elements are depicted with identical reference numerals.

Figure 2A:
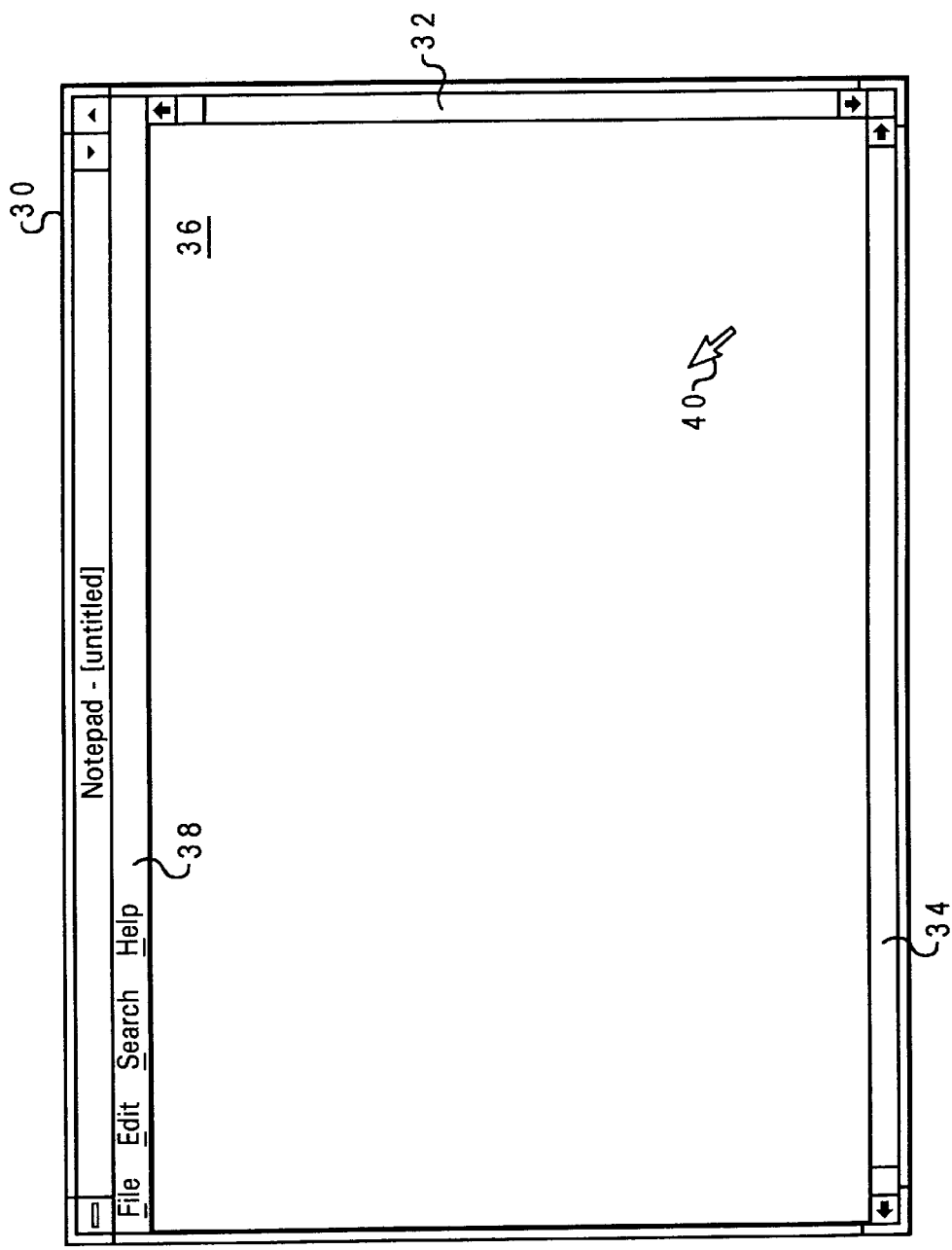
FIGS. 2A–2D are pictorial representations of display screens which illustrate the method and system of the present invention.

As depicted within FIG. 2A, a portion of a display surface in which display images pertaining to a particular application is depicted. Such portion is typically referred to as a "window". As depicted, window 30 includes a vertical scroll bar 32 and a horizontal scroll bar 34 which, in a manner well known to those having ordinary skill in the art, may be utilized to scroll through image areas larger in size than display are 36 within window 30. Additionally, a command bar 38 is depicted. Command bar 38 typically includes commands which are adapted to a particular application and which may be graphically selected utilizing a graphical pointing device, such as mouse 28. Selection of individual commands within command bar 38 is accomplished by the use of a displayed moveable cursor 40 which is relocated within display area 36 by physical movement of mouse 28.

Figure 2B:
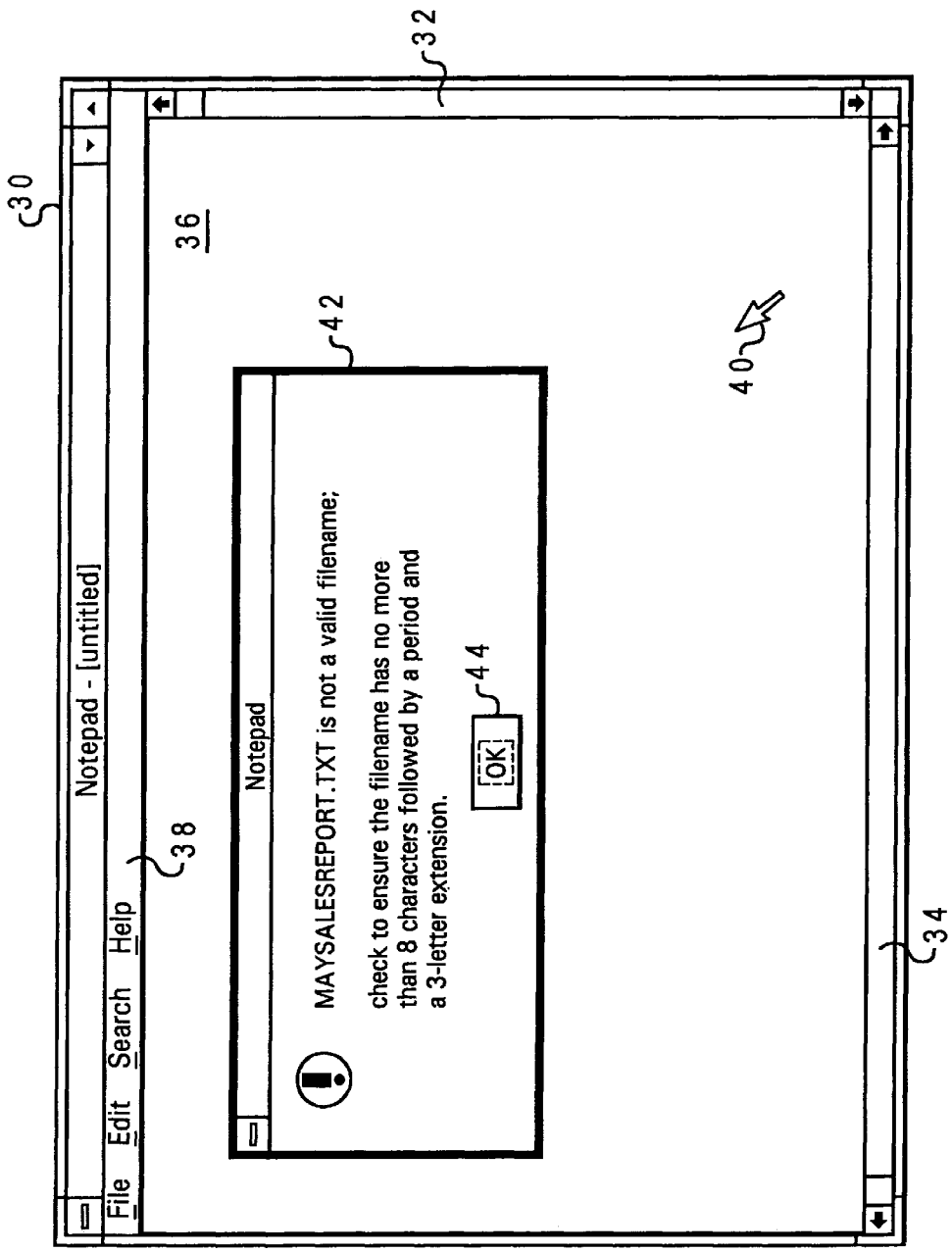

Referring now to FIG. 2B, there is depicted window 30, which is identical to the depiction within FIG. 2A; however, a so-called "message box," "message window," or "dialog box" 42 is depicted. As illustrated, a message, warning or other information is presented within message box 42 for notification of a user. In addition to the text containing the warning or message information a selection button 44 is also typically provided. In known graphical user interfaces message box 42 must be acknowledged and dismissed by selection of push button 44 utilizing moveable cursor 40 in order to resume the underlying application. It is precisely the necessity of a selection of a graphic element within message box 42 which the present invention seeks to eliminate.

Figure 2C:
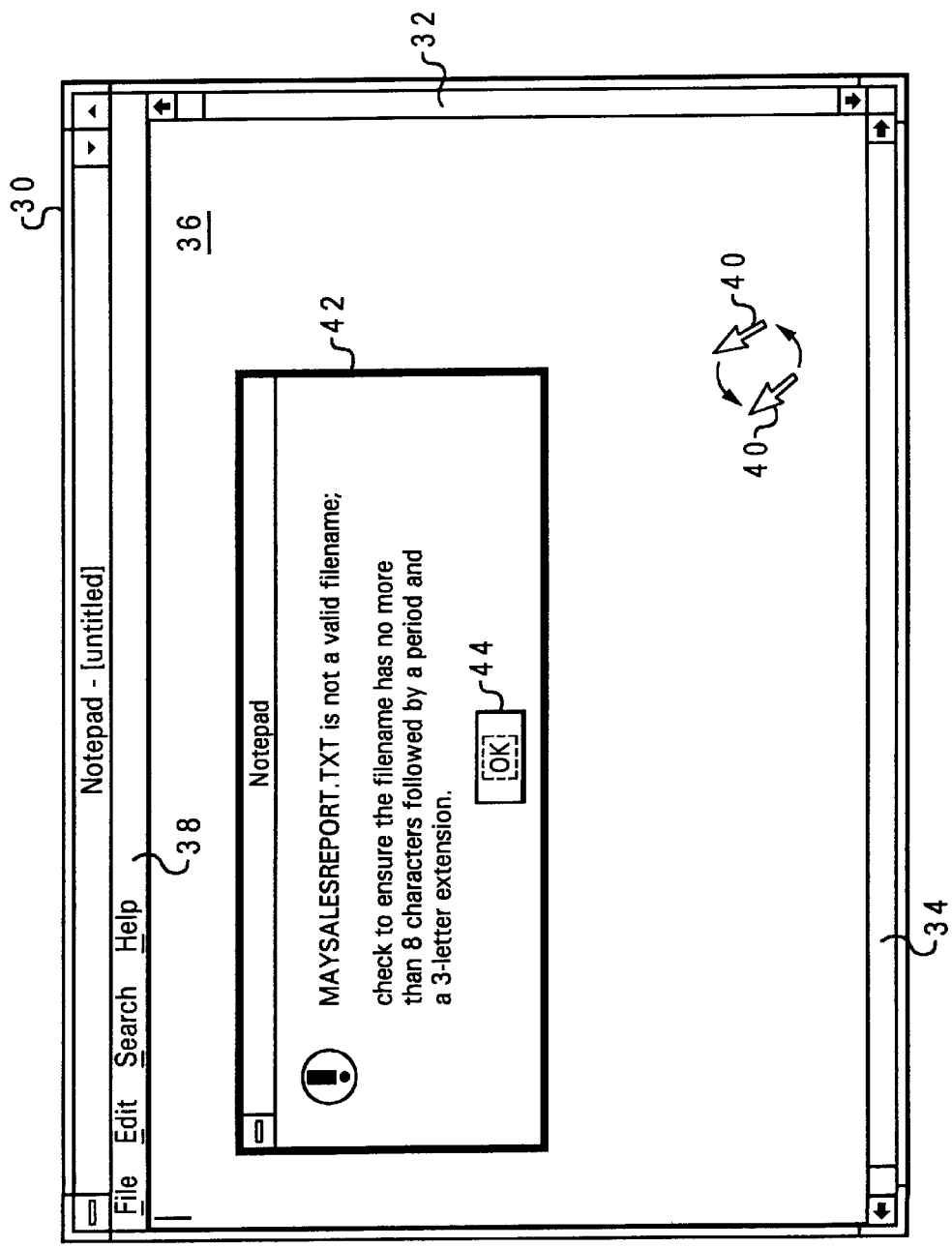

Referring now to FIG. 2C, it may be seen that the user, rather than graphically select push button 44 within message box 42, has merely oscillated the position of moveable cursor 40 with a small movement in generally opposite directions. As the arrows indicate, moveable cursor 40 has been moved and returned in generally opposite directions in a so-called "wiggle".

In accordance with an important feature of the present invention, once message box 42 has been displayed, the position of moveable cursor 40 is monitored and thereafter, a small perturbation in its position, such as an oscillation or "wiggle" may be utilized as an indication that the user wishes to dismiss message box 42, without the necessity of accurately selecting push button 44 within message box 42.

Figure 2D:
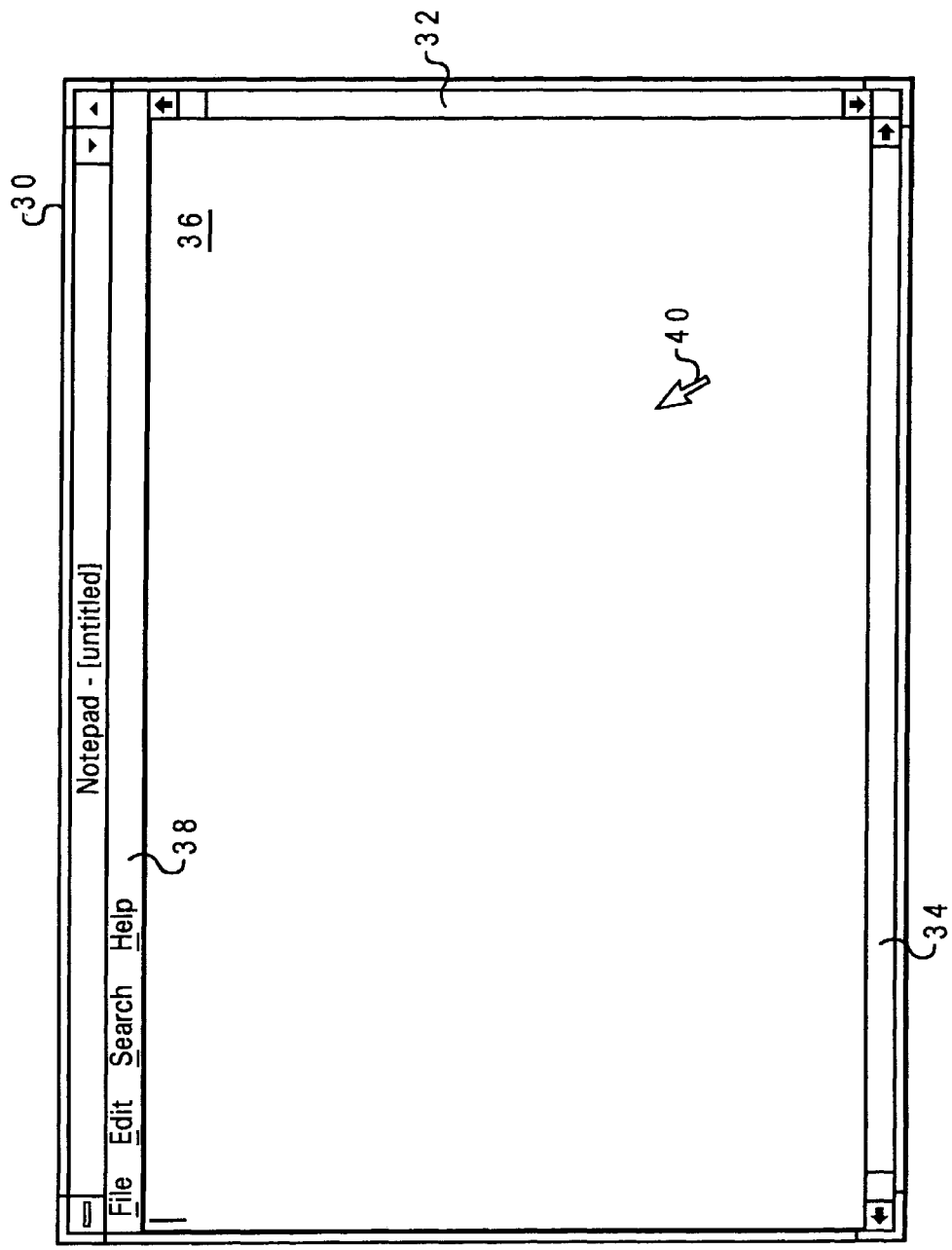

Finally, as depicted in FIG. 2D, it may be seen that upon detection of the oscillation of position of moveable cursor 40, message box 42 has been dismissed. That is, message box 42 is no longer displayed within display area 36 and the underlying application is once again free to respond to commands from the user. In this manner, as those having skill in this art will appreciate, the applicant has provided a technique whereby the necessity of accurately selecting a particular graphical element within a message box has been eliminated and a message box may be dismissed from the display, while insuring to a reasonable degree that the user has visually accessed the information contained within the message box.

Figure 3:
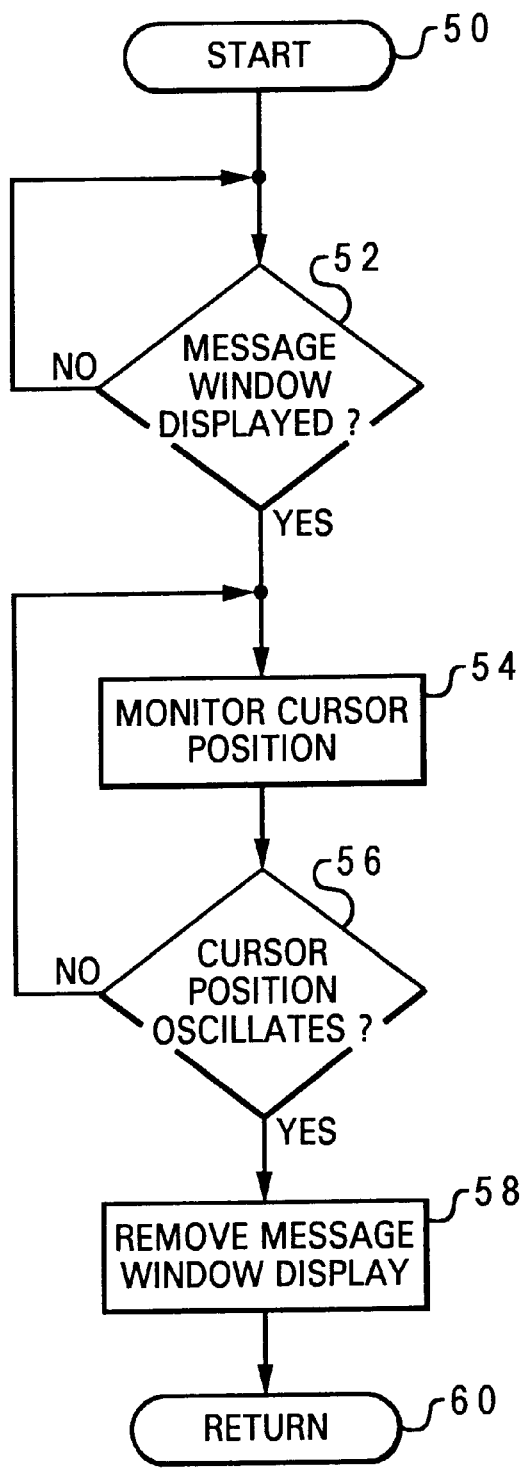
FIG. 3 is a high-level logic flowchart illustrating the process of the present invention.

Finally, with reference with FIG. 3, there is depicted a high-level logic flowchart which depicts the process of the present invention. As illustrated, this process begins at block 50 and thereafter passes to block 52. Block 52 depicts a determination of whether or not a message window has been displayed. Of course, as described above, the method and system of the present invention will also work with so-called dialog boxes or other overlying messages intended to advise the user of conditions within the data processing system.

In the event no message window is displayed the process continues in an iterative fashion, to await the display of a message window, message box, or dialog box. Still referring to block 52, once a message window has been displayed, the process passes to block 54. Block 54 illustrates the monitoring of the cursor position.

Thereafter the process passes to block 56. Block 56 depicts a determination of whether or not the cursor position has oscillated. That is, moved in a small perturbation in opposite directions, in the manner of a so-called "wiggle." In the event an oscillation in cursor position is not detected the process returns to block 54, in an iterative fashion, to continue monitoring cursor position.

Still referring to block 56, in the event an oscillation in cursor position has been detected, the process passes to block 58. Block 58 depicts the dismissal, or removal of the message window display and the process then passes to block 60 and terminates.

Upon reference to the foregoing those skilled in the art will appreciate that the applicant herein has developed a technique whereby annoying or unnecessary message boxes or dialog blocks may be easily dismissed without requiring the accurate graphical selection of a particular push button within the message box display. In this manner, the user may rapidly and efficiently return to control of the underlying application without requiring accurate graphical selection and while substantially ensuring that the user has become aware of the content of the message box.

While the invention has been particularly shown and described with reference to a preferred embodiment, it will be understood by those skilled in the art that various changes in form and detail may be made therein without departing from the spirit and scope of the invention.

What is claimed is:

1. A method for efficient dismissal of displayed message windows within a graphical user interface within a data processing system having a graphical pointing device and a displayed moveable cursor associated therewith, each displayed message window having a selection button for acknowledgment and dismissal of said message window, said method comprising the steps of:

monitoring a position of said displayed moveable cursor during display of a message window; and dismissing said message window in response to a detected oscillation in position of said displayed moveable cursor.

2. The method for efficient dismissal of displayed message windows within a graphical user interface within a data processing system according to claim 1 wherein said step of dismissing said message window in response to a detected oscillation in position of displayed moveable cursor comprises the step of dismissing said message window in response to a detected small movement of said displayed moveable cursor in a first direction followed by a detected small movement of said displayed moveable cursor in a substantially opposite direction.

3. A system for efficient dismissal of displayed message windows within a graphical user interface within a data processing system having a graphical pointing device and a displayed moveable cursor associated therewith, each displayed message window having a selection button for acknowledgment and dismissal of said message window, said system comprising the steps of:

means for monitoring a position of said displayed moveable cursor during display of a message window; and means for dismissing said message window in response to a detected oscillation in position of said displayed moveable cursor.

4. The system for efficient dismissal of displayed message windows within a graphical user interface within a data processing system according to claim 3 wherein said means of dismissing said message window in response to a detected oscillation in position of displayed moveable cursor comprises means for dismissing said message window in response to a detected small movement of said displayed moveable cursor in a first direction followed by a detected small movement of said displayed moveable cursor in a substantially opposite direction.

5. An apparatus for efficient dismissal of displayed message windows within a graphical user interface within a data processing system, said apparatus comprising:

a display coupled to said data processing system for displaying message windows each displayed message window having a selection button for acknowledgment and dismissal of said message window;

a graphical pointing device coupled to said data processing system;

a moveable cursor visually depicted within said display and moveable in response to manipulation of said graphical pointing device;

means for monitoring a position of said displayed moveable cursor during display of a message window; and means for dismissing said message window in response to a detected oscillation in position of said displayed moveable cursor.

6. The apparatus for efficient dismissal of displayed message windows within a graphical user interface within a data processing system according to claim 5, wherein said display means comprises a cathode ray tube display.

7. The apparatus for efficient dismissal of displayed message windows within a graphical user interface within a date processing system according to claim 5, wherein said display means comprises a mouse.

8. The apparatus for efficient dismissal of displayed message windows within a graphical user interface within a data processing system according to claim 5 wherein said means of dismissing said message window in response to a detected oscillation in position of displayed moveable cursor comprises means for dismissing said message window in response to a detected small movement of said displayed moveable cursor in a first direction followed by a detected small movement of said displayed moveable cursor in a substantially opposite direction.

* * * * *